United States Patent [19]

Hayashi et al.

[11] 4,166,879
[45] Sep. 4, 1979

[54] GAS-SHIELDED-TYPE COATED ARC WELDING ELECTRODE

[75] Inventors: Kuniaki Hayashi; Takatoshi Tomoyasu, both of Kamakura, Japan

[73] Assignee: Kobe Steel, Ltd., Kobe, Japan

[21] Appl. No.: 712,396

[22] Filed: Aug. 6, 1976

[30] Foreign Application Priority Data

Aug. 7, 1975 [JP] Japan .................. 50-96553

[51] Int. Cl.² .......................................... B23K 35/365
[52] U.S. Cl. .................................... 428/385; 106/74; 106/81; 106/84; 148/23; 428/386; 428/387
[58] Field of Search ............... 219/146; 106/74, 81, 106/84; 428/386, 387, 385; 148/23

[56] References Cited

U.S. PATENT DOCUMENTS

| | | | |
|---|---|---|---|
| 1,583,169 | 5/1926 | Pennington | 106/74 X |
| 1,972,063 | 8/1934 | Judy | 428/387 |
| 1,972,066 | 8/1934 | Pennington | 428/387 |
| 2,060,681 | 11/1936 | Miller et al. | 148/23 X |
| 2,102,891 | 12/1937 | Faulkner | 219/146 X |
| 2,164,775 | 7/1939 | Miller | 219/146 X |
| 2,248,104 | 7/1941 | Marini et al. | 428/385 |
| 2,421,594 | 6/1947 | Boot | 148/23 X |
| 2,440,941 | 5/1948 | Garriott | 106/84 |
| 2,623,147 | 12/1952 | Van Der Willigen | 106/84 |
| 2,642,516 | 6/1953 | Avery | 219/146 |
| 2,681,875 | 6/1954 | Stringham et al. | 148/23 |
| 2,745,771 | 5/1956 | Pease et al. | 148/23 X |
| 2,841,513 | 7/1958 | Morrison | 148/23 |
| 2,870,047 | 1/1959 | Kee | 428/387 X |
| 3,405,250 | 10/1968 | Lee | 219/146 |
| 3,783,020 | 1/1974 | Kimura et al. | 428/386 X |

FOREIGN PATENT DOCUMENTS 506489 10/1954 Canada ..................... 423/386

Primary Examiner—Richard E. Schafer
Attorney, Agent, or Firm—Oblon, Fisher, Spivak, McClelland & Maier

[57] ABSTRACT

This invention relates to a gas shielded-type coated arc welding electrode, more particularly to the coated electrode consisting of a mild steel core and coating material which comprises 20 - 40% organic material by weight of a total coating material, and 5 - 25% anhydrous sodium silicate by weight of said of organic material wherein the molar ratio of $SiO_2/Na_2O$ within said of anhydrous sodium silicate is 2.5 - 3.5. Such an electrode displays improved coating material moisture resistance and usability.

2 Claims, 1 Drawing Figure

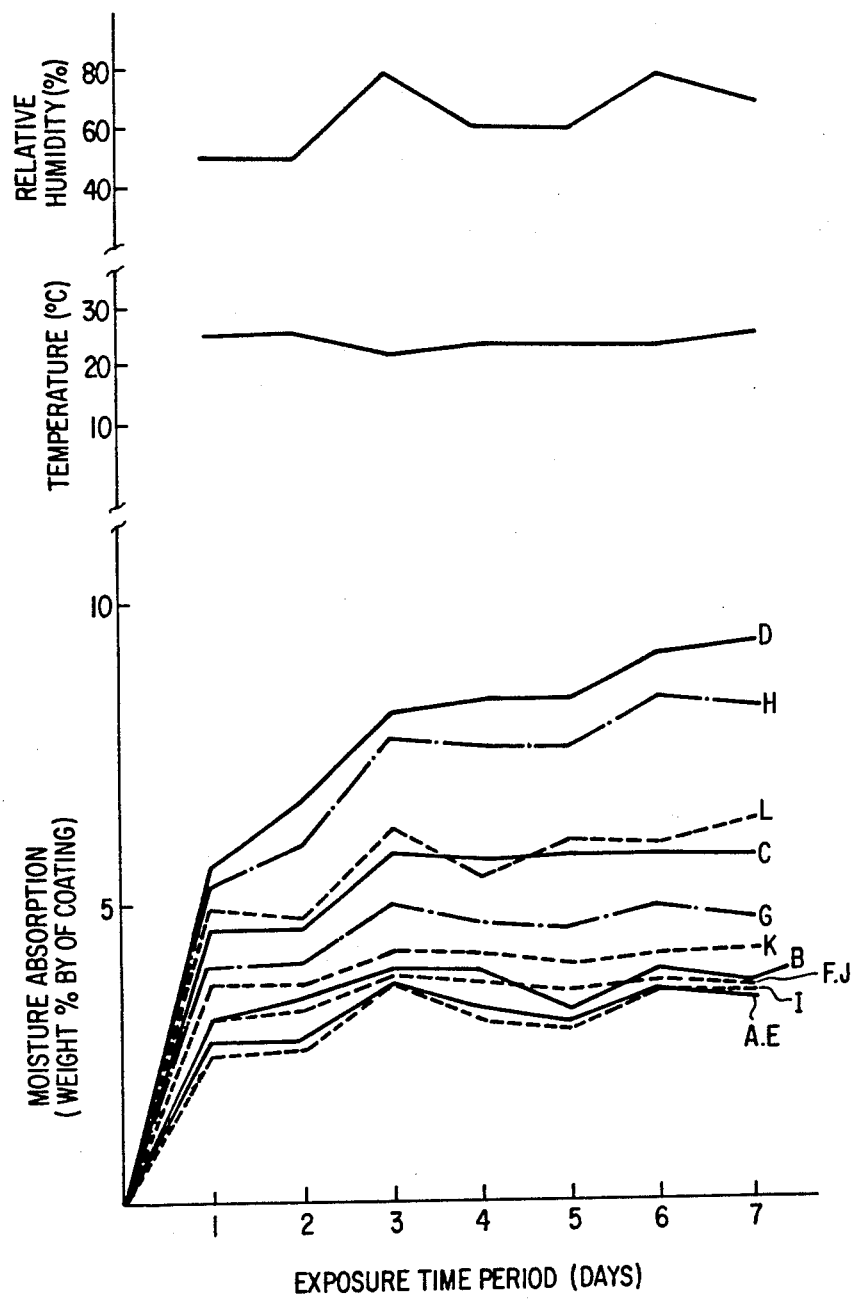

GAS-SHIELDED-TYPE COATED ARC WELDING ELECTRODE

BACKGROUND OF THE INVENTION

Conventionally, high cellulose-type gas shielded arc welding electrodes contain a large amount of organic materials such as cellulose, starch, wood flour, etc. as one of the principal components of the coating. Therefore, if a large welding current is applied to the electrode, the electrode is apt to burn. Hence, it has been desired to develop a coated electrode which has sufficient arc strength, sufficient arc spread and deep penetration using relatively low welding current. To this end, it is known that sodium silicate is very effective when used as a binding agent, or as one of the components in the coating material of a coated arc welding electrode. However, sodium silicate is extremely hygroscopic and soluble in water. Thus, if a large amount of sodium silicate is used in the coating material, the coating absorbs much moisture from the atmosphere. When the amount of moisture absorbed exceeds a certain level, the coating itself eventually begins to soften, resulting in deformation of the coating material during the welding operation.

Typical of such conventional compositions are those disclosed in the following patents. U.S. Pat. No. 2,210,777 and 2,209,829, both to General Electric Company, disclose an arc welding electrode of the shielded arc type wherein the moisture resistance of the electrode coating is improved.

U.S. Pat. No. 2,031,494 to Grassell Chemical Co. discloses the use of 30% cellulose (wood flour) and 15% sodium silicate by weight of the total coating material, but said sodium silicate is added as a sodium silicate solution and not as anhydrous sodium silicate.

U.S. Pat. No. 2,052,699 to A. O. Smith discloses the use of 13% cellulose (wood flour) and 42% sodium slicate by weight of the total coating material and the weight ratio of $SiO_2/Na_2O$ is 3; however, the sodium silicate is preferably used as water glass according to the disclosure of this patent.

U.S. Pat. No. 2,164,775 to Oxweld Acetylene Co. discloses that its sodium silicate solution contains 56.4% water.

U.S. Pat. No. 2,102,891 to Air Reduction Co. discloses the use of $Na_2O$ and $SiO_2$. The weight ratio of $SiO_2/Na_2O$ is 3.22. The use of deoxidizing agents in the coating is also disclosed.

U.S. Pat. No. 2,220,954 to Combustion Eng. Co. discloses alpha cellulose as an organic material as well as $TiO_2$ and iron oxide in a coating composition. U.S. Pat. No. 2,427,966 to Hirschler discloses the use of Fe-Mn, $TiO_2$ and an organic material containing lignin.

Nevertheless, none of the above-mentioned U.S. Patents specifically discloses the use of anhydrous sodium silicate as one of the ingredients of a coating material for a gas shielded-type coated arc welding electrode. Accordingly, a gas shielded-type arc welding coating electrode having an electrode coating with superior moisture resistance and having superior usability is still desired.

SUMMARY OF THE INVENTION

The present invention has been developed in order to eliminate many problems encountered in the conventional arc welding electrodes. Accordingly, the first object of the present invention is to provide a gas shielded-type coated arc welding electrode of good usability and superior moisture resistance in its electrode coating.

The second object of the present invention is to provide a gas shielded-type coated arc welding electrode which ensures deep penetration and which avoids any drooping down of molten metal during a welding operation performed in the vertical downward position.

These and other objects are achieved by the use of the coated electrode having the following features.

The first embodiment of the present invention is a gas shielded-type coated arc welding electrode consisting of a mild steel core and coating material which comprises 20-40% of organic material by weight of the total coating material, 5-25% of anhydrous sodium silicate by weight of total organic material, wherein the molar ratio of $SiO_2/Na_2O$ within said anhydrous sodium silicate is 2.5-3.5.

A second embodiment of the present invention is an electrode as set forth in the first embodiment, wherein said coating material further comprises 0.5-5% silica gel by weight of the total coating material.

A third embodiment of the present invention is an electrode as set forth in the first embodiment, wherein said coating material further comprises 5-15% of iron oxide, 10-35% of titanium oxide and 3-10% of deoxidizer, all by weight of said coating material.

A fourth embodiment of the present invention is an electrode as set forth in the third embodiment, wherein said coating material further comprises 0.5-5% of silica gel by weight of the coating material.

BRIEF DESCRIPTION OF THE DRAWING

FIG. 1 is a graph showing the amount of absorbed moisture in each coated electrode sample of Comparative Test I.

DETAILED DESCRIPTION OF THE PREFERRED EMBODIMENTS

Coating material according to the present invention comprises 20-40% of organic material by weight of the total coating material, 5-25% of anhydrous sodium silicate by weight of said organic material wherein the molar ratio of $SiO_2/Na_2O$ within said anhydrous sodium silicate is 2.5-3.5.

If the organic material content is less than 20% by weight of the coating, the required characteristics of a gas shielded-type coated arc welding electrode such as deep penetration, forceful spray-type arc, and formation of thin and easily separable slag, cannot be expected. On the other hand, if the contact of organic material is more than 40%, the coated electrode burns excessively, resulting in the generation of shielding gas before it can contribute to the shielding of the welding zone.

The anhydrous sodium silicate is very efficient for improving usability and its effective amount range can be determined in dependence on the amount of organic material used. If the amount of anhydrous sodium silicate is less than 5% by weight of the organic material, improved usability cannot be obtained. If the amount of said anhydrous sodium silicate is over 25% by weight of the organic material, no further beneficial effects of moisture resistance in electrode coating can be expected.

The molar ratio of $SiO_2/Na_2O$ in the anhydrous sodium silicate should be 2.5 to 3.5. If it is less than 2.5, the moisture absorption rate of the coating is too high, and if it is over 3.5, the moisture resistance of the coating and its usability are not satisfactory.

Titanium oxide is preferably added in an amount of 10-35% by weight of the coating material. If the amount is less than 10%, a stable arc is not maintained; while if over 35% is used, the welding arc force becomes weak, and the required characteristics of a coated arc electrode for use in gas shielded type welding, i.e., a forceful spray-type arc, deep penetration and the formation of a thin and easily separable slag, cannot be obtained.

Iron oxide is preferably added in an amount of 5-15% by weight of the coating material. If the amount is less than 5%, the welding arc is weakened and good results in X-ray inspection are not obtained. If the amount is over 15%, the welding arc becomes rough resulting in spattering.

The deoxidizing agent is preferably added in an amount of 3-10% by weight of the coating material. If the amount is less than 3%, sufficient deoxidizing effect is not expected; while if it is over 10%, pits appear in the weld metal.

Further, silica gel is preferably added in an amount of 0.5-5% by weight of the coating material, aiming to suppress the softening of the coating material due to moisture absorption, and further to improve the moisture resistance of the coating.

If the amount of silica gel is less than 0.5%, a sufficient moisture resistance effect is not expected; while if it is over 5%, the coating properties and usability are made worse. Silica gel, properly distributed within the coating of the electrode, absorbs the moisture which has been absorbed by the organic material and sodium silicate. Silica gel itself is not soluble in water. Therefore, even if the coating material absorbs a certain amount of moisture, the coating will retain sufficient strength. This is why silica gel is advantageous for preventing softening or deformation of the coating.

According to the present invention, sodium silicate solution, i.e., sodium water glass is indeed used as a binding agent for binding the flux material. However, this component is in liquid form so that the amount added is restricted, especially for modern high speed coating operations under high pressure. Thus, according to the invention, anhydrous sodium silicate powder is used to solve this problem and further to improve the usability of the electrode.

Sodium silicate solution can be made free from moisture by drying it. However, using such a dried component, the moisture absorption rate is very high and the component is apt to change into liquid form. On the other hand, there is no absorbed moisture in anhydrous sodium silicate from the beginning, and the moisture absorption rate is much lower compared with that of dried sodium silicate solution.

Accordingly, anhydrous sodium silicate is used instead of sodium silicate solution.

When using high cellulose type gas shielded-type coated arc welding electrodes, an appropriate amount of moisture absorption is effective in an actual welding operation. However, problems arise when the amount of absorbed moisture is so excessive that the coating softens and deforms during the welding operation, resulting in deterioration in usability.

The coated electrode according to the present invention is hereinafter compared to a conventional coated electrode.

COMPARATIVE TEST I

Table I shows the fundamental components of the coating materials of several electrode samples. Table II shows the chemical composition of the anhydrous sodium silicate used in the coated electrode samples. The results of atmospheric moisture absorption tests using each of the 12 high cellulose type electrodes A-L are shown in FIG. 1.

Table III shows the coating conditions and welding workability of the 12 kinds of high cellulose type coated electrodes A-L after exposure to the atmosphere for one week.

Table 1

| electrode sample | anhydrous sodium silicate | coating materials (% by weight of coating) | | | | | binding agent sodium water glass (% by weight of coating) |
|---|---|---|---|---|---|---|---|
| | | cellulose | Titanium oxide | iron oxide | Fe—Mn | asbestos | |
| A | — | 35 | 25 | 10 | 7 | 23 | 44 |
| B | 2(5.7) | " | " | " | " | 21 | " |
| C | 8.5(24.3) | " | " | " | " | 14.5 | " |
| D | 10(28.6) | " | " | " | " | 13 | " |
| E | — | 30 | 27.5 | " | " | 25.5 | 42 |
| F | 1.5(5) | " | " | " | " | 24 | " |
| G | 7.5(25) | " | " | " | " | 18 | " |
| H | 9(30) | " | " | " | " | 16.5 | " |
| I | — | 25 | 30 | " | " | 28 | 39 |
| J | 1.5(6) | " | " | " | " | 26.5 | " |
| K | 6(24) | " " | " | " | 22 | " | |
| L | 7.5(30) | " | " | " | " | 20.5 | " |

Note:
The value within () is the weight % of anhydrous sodium silicate by weight of the organic material (cellulose)

Table II

Chemical composition of anhydrous sodium silicate (% by weight of total anhydrous sodium silicate)

| $SiO_2$ | $Na_2O$ | $CaO$ | P | S | Molar ratio of $SiO_2/Na_2O$ |
|---|---|---|---|---|---|
| 73.7 | 24.8 | 0.09 | 0.001 | 0.002 | 3.05 |

Table III

Test results of comparative test I

| electrode sample | coating condition | usability |
|---|---|---|
| A | ◯ | △ |
| B | ◉ | ◎ |

Table III-continued

| | Test results of comparative test I | | |
|---|---|---|---|
| electrode sample | coating condition | | usability |
| C | ◉ | | ◉ |
| D | X | | X |
| E | ◉ | | △ |
| F | ◉ | | ◉ |
| G | ◉ | | ◉ |
| H | X | | X |
| I | ◉ | | X |
| J | ◉ | | ◉ |
| K | ◉ | | ◉ |
| L | △ | | △ |

◉ ; excellent
○ ; good
△ ; a little bad
X ; bad

Electrode samples A, E and I do not comprise anhydrous sodium silicate. The usability is either a little bad or bad as shown in Table III.

Electrode samples D, H and L comprise more than 25% anhydrous sodium slicate by weight of the organic material. For these, the moisture resistance is bad, and, as can be seen from Table III, the coating condition and usability are also bad. From the above test, 5–25% of anhydrous sodium silicate by weight of the organic material has been proven to be effective for moisture resistance and usability as well as in coating condition.

COMPARATIVE TEST II

Table IV shows the fundamental components of ten electrode coating samples M-V. Table V shows the coating conditions and the usabilities of the ten electrodes after being forced to absorb specific amounts of moisture.

Table IV

| | Fundamental components | | | | | | | binding agent |
|---|---|---|---|---|---|---|---|---|
| | coating materials (% by weight of coating) | | | | | | | sodium water glass (% by wt. of coating) |
| electrode sample | silica gel | anhydrous sodium silicate | cellulose | titanium oxide | iron oxide | Fe—Mn | Asbestos | |
| M | — | 1.5(5) | 30 | 27.5 | 10 | 7 | 24 | 42 |
| N | 0.5 | "(") | " | " | " | " | 28.5 | " |
| O | 2.5 | "(") | " | " | " | " | 21.5 | " |
| P | 5 | "(") | " | " | " | " | 19 | " |
| Q | 7.5 | "(") | " | " | " | " | 16.5 | " |
| R | — | 7.5(25) | " | " | " | " | 18 | " |
| S | 0.5 | "(") | " | " | " | " | 17.5 | " |
| T | 2.5 | "(" | " | " | " | " | 15.5 | " |
| U | 5 | "(") | " | " | " | " | 13 | " |
| V | 2.5 | "(") | " | " | " | " | 10.5 | " |

Note:
The value within ○ is the weight % of anhydrous sodium silicate by weight of the organic materials (cellulose).

Table V

| | Test results of comparative test II | | | | | |
|---|---|---|---|---|---|---|
| electrode sample | items of test result | amount of moisture absorption (% by weight of coating) | | | | |
| | | 0 | 3 | 6 | 9 | 11 |
| M | coating condition | ◉ | ◉ | △ | X | X |
| | usability | ◉ | ◉ | ○ | △ | X |
| N | coating condition | ◉ | ◉ | ○ | X | X |
| | usability | ◉ | ○ | ○ | △ | X |
| O | coating codition | ◉ | ○ | ○ | △ | X |
| | usability | ◉ | ○ | ○ | △ | X |
| P | coating condition | ◉ | ◉ | ◉ | ○ | X |
| | usability | ○ | ○ | ○ | △ | X |
| Q | coating condition | bad coating property, impossible to coat | | | | |
| R | coating condition | ◉ | ◉ | △ | X | X |
| | usability | ○ | ○ | ○ | X | X |
| S | coating condition | ◉ | ◉ | ○ | X | X |
| | usability | ○ | ◉ | ○ | △ | X |
| T | coating condition | ◉ | ◉ | ○ | △ | X |
| | usability | ○ | ○ | ○ | △ | X |
| U | coating condition | ◉ | ◉ | ◉ | ○ | △ |
| | usability | ○ | ◉ | ○ | ○ | X |
| V | coating condition | bad coating property, impossible to coat | | | | |

◉ ; excellent
○ ; good
△ ; a little bad
X ; bad

As is apparent from Table V, 0.5-5% of silica gel by weight of the coating, added in the form of a powder to the coating comprising 5-25% by weight of organic material, has been proven to be more advantageous for moisture resistance of the coating. The more the amount of silica gel that is added, the better the coating condition that has been obtained. But, if the amount of silica gel increased to 7.5% such as in samples Q and V, the coating property is so bad that coating cannot be performed. Accordingly, silica gel is preferably added in an amount of 0.5-5% by weight of the coating.

In the above comparative tests I and II, sodium water glass has been used as a binding agent. However, potassium water glass alone or in combination with sodium water glass has been shown to cause the same effect.

As hereinabove described, a coated electrode according to the present invention displays advantageous effects in usability and moisture resistance of its electrode coating, by the use of anhydrous sodium silicate.

What is claimed as new and intended to be covered by Letters Patent is:

1. In a gas-shielded-type coated arc welding electrode of improved moisture resistance and usability consisting of a mild steel core and a coating comprising 20–40% by weight of organic material and a sodium water glass binder in an amount sufficient to bind the flux components, the improvement which comprises a coating which contains from 5 to 25% of anhydrous sodium silicate by weight of said organic material wherein the mole ratio of $SiO_2/Na_2O$ in said anhydrous sodium silicate is 2.5 to 3.5.

2. The coated electrode of claim 1, wherein said coating further comprises, by weight of the coating, 5–15% of iron oxide, 10–35% of titanium oxide, and 3–10% of deoxidizing agent.

* * * * *